Figure 1:
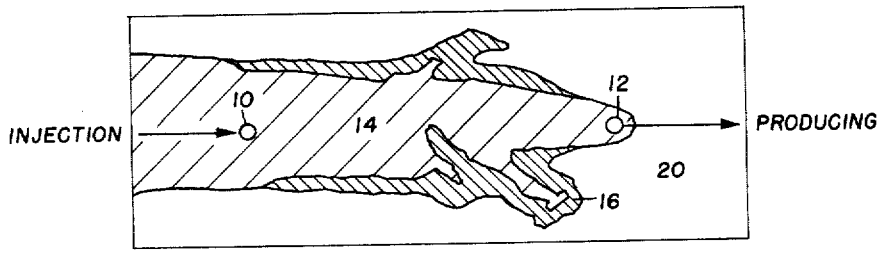

Sept. 3, 1963     O. C. HOLBROOK ET AL     3,102,587
SOLVENT WATER-FLOOD SECONDARY RECOVERY PROCESS
Filed Dec. 14, 1959

INVENTORS
ORRIN C. HOLBROOK
LE ROY W. HOLM
BY
Edward H. Lang
ATTORNEY

United States Patent Office 3,102,587
Patented Sept. 3, 1963

3,102,587
SOLVENT WATER-FLOOD SECONDARY
RECOVERY PROCESS
Orrin C. Holbrook and Le Roy W. Holm, Crystal Lake, Ill., assignors to The Pure Oil Company, Chicago, Ill., a corporation of Ohio
Filed Dec. 14, 1959, Ser. No. 859,461
3 Claims. (Cl. 166—9)

This invention pertains to an improved method for recovering oil from subterranean reservoirs. More particularly, this invention is directed to an improved secondary recovery process for recovering additional quantities of oil from partially depleted reservoirs.

Secondary recovery of petroleum from subterranean reservoirs by water-flooding or gas-driving has been practiced for many years, with substantial improvement in oil recoveries over those realized by primary depletion methods. More recently, it has been recognized that even greater recoveries are obtained by displacing the reservoir oil with a relatively small quantity of oil-miscible solvent, which is usually driven through the reservoir as a bank by a subsequently-injected fluid which may or may not be miscible therewith. For example, liquefied petroleum hydrocarbons, such as propane or butane, have been introduced as an oil-miscible bank, and this bank has been driven through the formation by injecting natural gas or water. It has further been suggested that improvements may be obtained by using certain oxygenated hydrocarbons as the oil-miscible solvent, since these oxygenated hydrocarbons, such as alcohols, ketones, etc., are soluble to an appreciable extent both in the oil and water. Such a method has been called a single-phase or miscible-phase displacement process in that a smooth transition from oil zone to solvent zone, and from solvent zone to water zone is achieved, without the existence of any well-defined interface.

Each of these methods can be demonstrated by core experiments to recover more oil than is recovered by a simple water-flood or gas-drive, but each method has certain inherent deficiencies which are at least partially due to unfavorable ratios in the solubilities of the mutual solvent in petroleum and water, or to unfavorable ratios in the mobilities of the various phases present in the formation. In order to render a process economical, it is not only necessary that the solvent act to substantially improve oil recoveries over those which would be obtained by a water-flood alone, but it is further necessary that the solvent, which itself has substantial value, also be recoverable before the oil-to-water ratio at the producing wells rises to such a level as to make further water-injection economically unattractive. The ratios of the mobilities of the various phases present in the formation, that its, the ratio of the mobilities of the oil and solvent, and of the solvent and water, are important in that it is necessary to obtain a high sweep efficiency in order to contact substantially the whole reservoir with the solvent, and further to prevent fingering of the water phase through the solvent bank and into contact with the oil phase.

It is an object of this invention to provide a miscible-phase, secondary recovery process from which outstanding oil recoveries and solvent recoveries are obtained. It is a further object of this invention to provide a miscible-phase process for the recovery of increased quantities of oil which results in the contacting of substantially all of the formation being treated, and further, permits recovery of a large portion of the miscible solvent before the water-to-oil ratio at the producing well reaches uneconomically high levels.

Briefly, the method of this invention comprises injecting through an input well into the formation a miscible solvent which is highly soluble in both water and oil, which has a viscosity not greatly different from that of the oil, and which has a coefficient of partition which strongly favors its solution in the oil phase of the reservoir. It has been found that such a solvent is provided by dissolving 10 to 40% by volume, measured as a liquid, of carbon dioxide in a selected, oxygenated hydrocarbon. The oxygenated hydrocarbon-carbon dioxide solution is driven through the reservoir by the injection of flood-water. Reservoir fluids and injected solvent are recovered at the output wells.

The superiority of the method of this invention, and the deficiencies of the prior art techniques, have been demonstrated by means of X-ray examination of the flow patterns in model flood patterns, as shown in FIGURES 1, 2, 3, and 4. In these studies, slabs of consolidated sandstone, scaled to represent a segment of a reservoir between an injection and a producing well, were encased in a fluid-tight enclosure, and holes were drilled closely adjacent to each end, perpendicular to the slab, to represent injection and producing wells. The various processes were carried out using fluids whose properties were related in a manner which simulated the relationships actually existing in field practice, i.e., the properties of the fluids were scaled to the properties of the actual fluids which would be used in the field-test oil, solvent, and water. The progress of the flow of the fluids through the model was observed by means of X-ray photographs, with the patterns represented in FIGURES 1, 2, 3, and 4 existing during each experiment when about 0.70 pore volume of fluid had been injected. This type of study is considered to be more nearly representative of the actual field conditions than are core studies because the fluids undergo radial flow immediately around the injection well, linear flow between the wells, and finally radial flow near the producing well, as occurs in field projects. Core studies inherently are limited to demonstration of the effects of linear flow only. Consequently, results observed from the slab models are dependent upon the cumulative effects of pore displacement and volumetric sweep efficiencies, while the results observed in core studies, and especially in studies where small-diameter cores are used, are dependent almost entirely upon pore displacement efficiencies, i.e., the efficiency with which the flood displaces petroleum from the contacted pores of a porous rock.

The fluids used in slab experiments must contain some material capable of producing clear X-ray shadow-graphs. Iodohexenes were used for this purpose. It is further desirable to conduct the tests at room temperature and at reasonable pressures. Hence the injected composite fluids must be scaled to represent accurately the behavior of the actual fluids at typical reservoir temperatures and pressures. In each case the scaled fluid was a composite liquid made up to respond under test conditions as the actual fluid would behave under reservoir conditions. Accordingly, displaced and displacing fluids were scaled to have the same relative solubilities, specific gravities, and flow shear-forces as would exist between the actual fluids under typical reservoir pressures and temperatures.

For each of the slab experiments set out in FIGURES 1 to 4, a corresponding core test was made. Thus, the sweep pattern and sweep efficiency of each of the processes could be correlated with the pore displacement-efficiency results obtained from the core tests. In the experiment represented in FIG. 1, a small quantity of a liquid scaled to represent liquefied propane was introduced through injection well 10 into the sandstone, which contained a liquid scaled to represent crude oil. For simplicity, a liquid scaled to represent another liquid will hereafter be designated by an "s" prefix, hence s-propane and s-oil will denote liquids scaled to represent propane and oil, respectively. After the injection of s-propane, a gas scaled to represent natural gas was injected in accordance with well-known, miscible-displacement, gas-drive practice. It is apparent that the s-gas tended to finger through the s-propane bank, and in fact completely disrupted the bank and broke through at the producing well before much of the reservoir section had been swept by the injected fluids. Referring to FIGURE 1, sweep occurs between injection well 10 and producing well 12. Zone 14 is that occupied by s-gas, zone 16 is that occupied by s-propane, and zone 20 is that occupied by s-oil after 0.70 pore volume of fluid have been injected. The poor flood efficiency resulted from the unfavorable ratios between the viscosity (mobility) of the displaced s-propane and the displacing s-gas. The propane was scaled to a viscosity of about 0.1 cp., the s-gas scaled to a viscosity of about 0.01 cp. This inefficiency was also reflected in the results obtained in an experiment set out as Run 2, of Table I, which run was made in a core of relatively large diameter (3.5 inches diameter by 7 inches), using the actual fluids at elevated pressure.

All floods were at 1000 p.s.i., pressure and 125° F., except Floods 2 and 3, which were made at 1300 p.s.i. The data listed under "Core Results" were obtained from these core tests. Sweep efficiency data appearing under "Model Studies" were obtained by tests using scaled fluids in rock slabs as set out pictorially in FIGURES 1 to 4. The data appearing under "Results Extended to Reservoir" are calculated from the core results and from the model studies. Thus, the recoveries obtained in the core tests are considered together with the volumetric sweep efficiency (indicated by the model studies) to project the results which could actually be expected from carrying out the process in a reservoir. The first column under "Results Extended to Reservoir" indicates the amount of oil which could be expected to be recovered after the injection of 1.5 pore volumes of total fluid, and is expressed as a percentage of oil initially in place. The last column indicates the percentage of injected solvent which may be expected to be recovered after 1.5 pore volumes of total fluid are injected. Considering Run 2, it can be

TABLE I

*Oil Recovery From Oil-Bearing Berea Sandstone Core*

[36° API West Texas crude oil]

| Run No. | Recovery Process | Core Results ||||||| 
|---|---|---|---|---|---|---|---|---|
| | | Solvent Injected, percent P.V. | Oil In Place In Core, percent P.V. | Oil Recovered at Solvent Breakthru, percent P.V. | Total Oil at 20,000/1 G.O.R., percent O.I.P. | Recovered at 100/1 W.O.R., percent O.I.P. | Residual Oil After Flood, percent P.V. | Solvent Recovered,[2] percent of Solvent Injected |
| 1 | Water Flood | | 61.3 | [1] 27.8 | | 49.8 | 39.8 | |
| 2 | Propane slug followed by methane gas. | 14 | 61.3 | 17.8 | 68.3 | | 19.5 | 90 |
| 3 | CO₂ followed by carbonated water. | 19.5 | 61.3 | [1] 34.5 | | 64.3 | 21.9 | 60 |
| 4 | Amyl alcohol slug followed by water. | 19.5 | 61.3 | 47.8 | | 91.3 | 5.3 | 12 |
| 5 | tert.-Butyl alcohol followed by water. | 19.5 | 61.3 | 25.0 | | 73.3 | 16.5 | 46 |
| 6 | CO₂-tert.-butyl alcohol mixture followed by water. | 12.1 | 61.3 | 38.4 | | 83.7 | 10.1 | 79 |
| 7 | ...do... | 19.5 | 61.3 | 40.0 | | 90.0 | 6.2 | 75 |

| Run No. | Recovery Process | Model Studies ||| Results Extended to Reservoir ||
|---|---|---|---|---|---|---|
| | | Volumetric Sweep Efficiency at 1.5 P.V., Total Fluid Injected, Percent | Viscosity Ratio || Comparative Oil Recovery From a Reservoir (Columns 5 times 8), Percent O.I.P. | Comparative Solvent Recovery From a Reservoir (Column 7), Percent Injected |
| | | | Oil to Solvent | Solvent To Final Flooding Agent | | |
| 1 | Water Flood | 90 | 1-1 | 1-1 | 44.7 | |
| 2 | Propane slug followed by methane gas. | 70 | 10-1 | 10-1 | 47.7 | 90 |
| 3 | CO² followed by carbonated water. | 80 | 20-1 | 1-20 | 51.4 | 60 |
| 4 | Amyl alcohol slug followed by water. | 95 | 1-5 | 5-1 | 86.5 | 12 |
| 5 | tert.-Butyl alcohol followed by water. | 95 | 1-4 | 4-1 | 69.6 | 46 |
| 6 | CO²-tert.-butyl alcohol mixture followed by water. | 90 | 1-1 | 1-1 | 75.3 | 79 |
| 7 | ...do... | 90 | 1-1 | 1-1 | 81.0 | 75 |

Sandstone core 3½" in diameter x 7" long.
All floods at 1000/p.s.i.g. and 125° F., except 2 and 3 which were at 1300 p.s.i.g.
[1] At water breakthrough.
[2] After 1.5 pore volumes of fluid injected.
O.I.P. = Original oil in place.
W.O.R. = Water to oil ratio.
G.O.R. = Gas to oil ratio.

Continuity of the propane bank as it advanced all the way through the producing well could be made more certain by injecting more propane at the outset, but this becomes impractical in field practice due to the cost of the propane injected. Breakdown of the propane bank results in poor oil displacement. Note that Table I shows that propane slug followed by methane gas left a residual oil after flood of 19.5 pore volume percent.

All of the tests set out in Table I were made on sandstone cores 3.5 inches in diameter and 7 inches long.

seen that although the oil recovery was fair and the solvent recovery was excellent, 90% of that injected, still the process was unsatisfactory because of the very poor sweep efficiency. Only 70% of the reservoir was contacted. Thus, the projected oil recovery was very poor, only 47.7%

Figure 2:
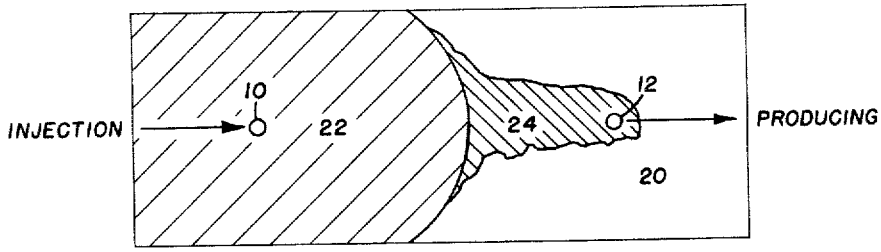

In the experiment represented by FIGURE 2, a slug of s-carbon dioxide 24 was injected into the sandstone, which again contained liquid 20 scaled to represent oil, and the s-carbon dioxide slug was driven through the sandstone by a fluid scaled to represent a water drive, 22. The s-water showed excellent sweep efficiency, but the s-carbon dioxide fingered through the s-oil and broke through at the producing well while a large portion of the reservoir remained uncontacted. An overall sweep efficiency of only 80% was realized, as indicated by Run 3, of Table I. In Run 3, the actual fluids were used at elevated pressures. The low displacement efficiency in the core was primarily caused by the fact that $CO_2$ and crude oil are not completely miscible at these conditions and by the unfavorable ratio between the viscosities of the oil (about 1 cp.) and carbon dioxide (about 0.05 cp.).

Figure 3:
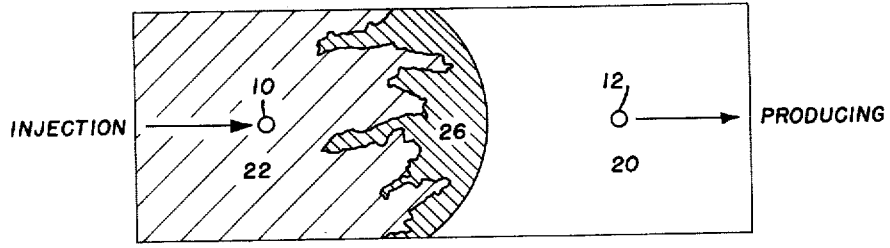

In still another experiment, represented by FIGURE 3, a slug of liquid 26 scaled to represent tertiary-butyl alcohol was injected into the sandstone, and this slug was followed by the injection of liquid 22 scaled to represent water. The s-alcohol swept the reservoir very efficiently. The recovery of a fairly high percentage of the oil was demonstrated by another analogous core experiment, Run 5, wherein the actual fluids were used at elevated pressure. However, two disadvantages of this method were noted. First, the alcohol, being more soluble in water than in oil, was lost by solution in the water to an appreciable degree. Such loss necessitates larger slugs of alcohol in order to maintain a satisfactory bank. This was reflected in the low solvent recovery observed in the core experiment. Note that only 46% of the tertiary-butyl alcohol was recovered, as compared to 90% of the propane slug of Run 2, and 60% of the carbon dioxide of Run 3. Since the injected solvent is expensive, such low solvent recoveries make this method economically unattractive. The displacing water, as shown in FIGURE 3, tended to finger through the s-alcohol and retard the progress of the s-alcohol, leaving a substantial residue thereof in the reservoir. The also was reflected in the low solvent recovery observed in the core experiment.

Figure 4:
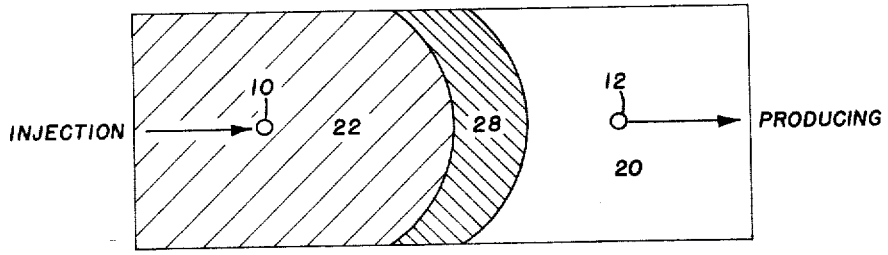

The method of this invention was demonstrated by the experiment represented by FIGURE 4, in which a slug of liquid 28 representing tertiary-butyl alcohol saturated at 700 p.s.i. with carbon dioxide was injected into the sandstone, and driven therethrough by liquid 22 scaled to represent water. It is apparent that the solvent bank remained extremely uniform and that the sweep and displacement efficiencies of both the solvent and the water were very outstanding. This result was supported by the core experiments of Runs 6 and 7 wherein actual fluids were used at elevated pressures. The oil recovered in Run 7 was 90% of the oil in place in that part of the reservoir actually contacted by the flood. A volumetric sweep efficiency of 90% was obtained. Projecting these results to actual reservoir conditions, it could be expected that 81% of the oil initially in place in the reservoir would be recovered, as indicated in Table I. Of equal importance is the fact that 75% of the solvent injected was recovered after the injection of 1.5 pore volumes of total liquids. The superiority of the method of this invention is therefore demonstrated. While superior solvent recovery was obtained in the propane-solvent, methane-sweep method of Run 2, the oil recovery was wholly unsatisfactory. The use of amyl alcohol followed by water, as set out in Run 4, produced excellent oil recoveries, but only 12% of the alcohol itself was recovered. Thus, the method exemplified by Run 4 is also unsatisfactory. The superiority of the method of this invention, as exemplified in Runs 6 and 7, appears to be primarily dependent upon the high solubility of the solvent mixture in both the oil and the water drive, but with marked preferential solubility in the oil, and is secondarily dependent upon the similarity in the viscosities of the reservoir oil, the solvent solution, and displacing water. The requisite solubility ratios are achieved only at high pressures, preferably pressures in excess of 700 p.s.i., at which carbon dioxide solubility in oil begins to increase rapidly, and the process of this invention is therefore limited to application at elevated pressures. However, this pressure level will vary with the properties of the crude oil and of the oxygenated hydrocarbon used, and with the temperature of the reservoir. In extreme circumstances, the pressure may be as low as 300 p.s.i.

The novel miscible solvent of this invention must be characterized as being miscible with both the reservoir oil and the injected water through the entire range of 0–5 volumes of solvent per volume of oil, and 0–5 volumes of solvent per volume of water. Greater miscibility ranges are desirable. Moreover, the solvent must have a partition coefficient of at least 70/30, favoring solution in the oil when the solvent is in the presence of both oil and water. Put another way, while the solvent is highly soluble in both oil and water, it must preferentially dissolve in the oil when exposed to both water and oil. A partition coefficient of at least 70/30 is necessary, and coefficients more strongly favoring solution in the oil are desired. These solubility characteristics prevent excessive loss of the solvent to the connate water in the reservoir, and to the drive water. Furthermore, they assure that the solvent efficiently sweeps the oil from the formation, and that the water, in turn, sweeps the solvent from the formation, thereby maintaining a zone of relatively pure solvent with only a relatively small volume of solvent being required.

It has been found that certain oxygenated hydrocarbons, when combined in specified proportions with carbon dioxide, result in the attainment of the requisite solubility and viscosity relationships, with the consequent realization of the results discussed above. Exemplary of the oxygenated hydrocarbons which are suitable for use in accordance with this invention are: tertiary-butyl alcohol, acetaldehyde, propionic acid, propyl alcohol, and isopropyl alcohol. The amount of carbon dioxide required to be dissolved in the oxygenated hydrocarbon depends upon the particular oxygenated hydrocarbon used, upon the properties of the reservoir oil, and upon the flooding pressure and temperature, but in general, quantities of carbon dioxide ranging from 10 to 40% by volume of the oxygenated hydrocarbon (measured as a liquid) are satisfactory. The exact, optimum concentration to be used can be determined experimentally by measuring the relative solubilities of solutions of varying composition in water and reservoir oil, determining the partition coefficient, and determining the ratio of the viscosity of the reservoir oil to the viscosity of the solvent solution. The ratio will preferably range from 1:2 to 2:1. Preferably, but of less importance, the solvent solution should have a viscosity about equal to that of the oil. As before mentioned, the solvent solution must be highly soluble in both water and reservoir oil, but must be preferentially soluble in the oil.

TABLE II

*Solubilities (75° F.) of Solvents in Water and Crude Oil*

[Cc. of solvent/100 cc. of crude oil or water]

| Solvent | In Water Alone | In Oil Alone | Partition Coefficient With Oil and Water Present | |
|---|---|---|---|---|
| | | | In Water | In Oil |
| Isopropyl Alcohol | >1,000 | >1,000 | 98 | 2 |
| tert.-Butyl Alcohol | >1,000 | >1,000 | 83 | 17 |
| n-Amyl Alcohol | 2.5 | >1,000 | 1 | 99 |
| Methyl Ethyl Ketone | 50 | >1,000 | 4 | 96 |
| $CO_2$-tert.-Butyl Alcohol (alcohol saturated with $CO_2$ at 700 p.s.i.) | >1,000 | >1,000 | 11 | 89 |

The solubilities of several oxygenated hydrocarbons in oil and water, and their partition coefficients in oil and water, when both are present, are listed in Table II. For purposes of comparison, similar data are presented for a solution of carbon dioxide in tertiary-butyl alcohol, which solution is representative of the solvents to be used in accordance with this invention. It will be noted that all of the oxygenated hydrocarbons listed, which are highly soluble in both oil and water, are preferentially soluble in the water. That is, the coefficient of partition favors greater dissolution in the water. It is necessary for this invention that the oxygenated hydrocarbon solvent have a partition coefficient favoring greater dissolution in the oil. It has been found that a few oxygenated hydrocarbons possess the desired solubilities in water and oil which can be modified to have a favorable coefficient of partition by admixture with carbon dioxide. It is seen from Table II that tertiary-butyl alcohol has a partition coefficient of 83/17 favoring solution in water, but when this alcohol is saturated with carbon dioxide at 700 p.s.i., the partition coefficient is altered to 89/11, favoring solubility in the oil. It will be noted from Table II that both n-amyl alcohol and methyl ethyl ketone have favorable partition coefficients. Run 4 of Table I shows that n-amyl alcohol functions in a very satisfactory manner as a miscible solvent, except that only a small proportion of the alcohol is recovered, 12%. This low recovery is attributable to the low solubility of n-amyl alcohol in water. The high solubility in oil, favorable coefficient of partition, and favorable viscosity leads to the excellent recoveries of oil obtainable with this alcohol. It can be seen that an additional condition, solubility in water, is critical to the recovery of the solvent itself.

Tests using methyl ethyl ketone as a miscible solvent were conducted, but are not reported in Table I. Excellent oil recoveries, as would be predicted from the solubility in oil and partition coefficient shown in Table II, were in fact obtained. As would be suggested from the relatively low solubility of methyl ethyl ketone in water, the recovery of the solvent was too low to produce a satisfactory process. The recoveries of methyl ethyl ketone were, however, substantially better than for n-amyl alcohol, as again might be predicted from the data of Table II. Only such materials as have a solubility in water and a solubility in oil of at least about 0.05 cubic centimeter of solvent per cubic centimeter of oil and per cubic centimeter of water are satisfactory. No material is known which possesses these characteristics and in addition meets the requirement of having a partition coefficient in excess of 70/30, favoring dissolution in the oil. Therefore, it is necessary to resort to techniques for producing a composite material which possesses the requisite solubilities and partition coefficient, and is additionally characterized as having a suitable viscosity.

As a specific example of the method of this invention, an oil-containing, subterranean reservoir is produced by injecting through an input well and into the formation 0.20 pore volume of tertiary-butyl alcohol which is saturated at 700 p.s.i. with carbon dioxide. This solvent is injected at a pressure of 1000 p.s.i. and driven through the reservoir by water-injection. Reservoir fluids are produced from an output well. After 1.5 pore volumes of fluids have been injected through the input well, further injection of fluids is terminated. At this time, 81% of the oil initially in place in the reservoir has been produced, and 75% of the injected solvent is recovered.

The volume of the injected solvent slug is not critical, and in general, larger quantities of solvent will result in better oil recoveries, but also in the loss of larger volumes of solvent. Quantities of solvent ranging from 0.01 to 0.30 pore volume may be used.

The embodiments of the invention in which an exclusive property or privilege is claimed are defined as follows:

1. A method for recovering oil having a viscosity similar to that of water from an underground reservoir comprising the steps of injecting into said reservoir through an input well an amount of solvent equivalent to 0.01 to 0.30 reservoir pore volume, driving said solvent through said reservoir under a pressure of not less than 300 p.s.i. to an output well by injecting water into said input well, and recovering oil and solvent from said output well, said solvent consisting essentially of at least one compound selected from the group consisting of tertiary-butyl alcohol, acetaldehyde, propionic acid, propyl alcohol, and isopropyl alcohol, in which is dissolved 10–40% by volume of carbon dioxide, measured as a liquid.

2. A method according to claim 1 in which said solvent comprises tertiary-butyl alcohol and carbon dioxide.

3. A method in accordance with claim 1 in which said alcohol-carbon dioxide solution and said water are injected at pressures in excess of 700 p.s.i.

References Cited in the file of this patent

UNITED STATES PATENTS

| | | |
|---|---|---|
| 2,875,830 | Martin | Mar. 3, 1959 |
| 2,875,831 | Martin et al. | Mar. 3, 1959 |
| 2,885,003 | Lindauer | May 5, 1959 |

UNITED STATES PATENT OFFICE
CERTIFICATE OF CORRECTION

Patent No. 3,102,587                         September 3, 1963

Orrin C. Holbrook et al.

It is hereby certified that error appears in the above numbered patent requiring correction and that the said Letters Patent should read as corrected below.

Column 1, line 54, for "its" read -- is --; column 5, line 35, and column 6, line 48, for "The", each occurrence, read -- This --; column 6, line 56, for "Cc." read -- cc. --; Table II, under the column heading, "In Water Alone", line 3 thereof, for "2,5" read -- 2.5 --; same Table II, under the column heading "Solvents", line 5 thereof, after "Butyl" strike out "Alcohol".

Signed and sealed this 3rd day of March 1964.

(SEAL)
Attest:

ERNEST W. SWIDER                                    EDWIN L. REYNOLDS

Attesting Officer                                       Acting Commissioner of Patents